Figure 1:
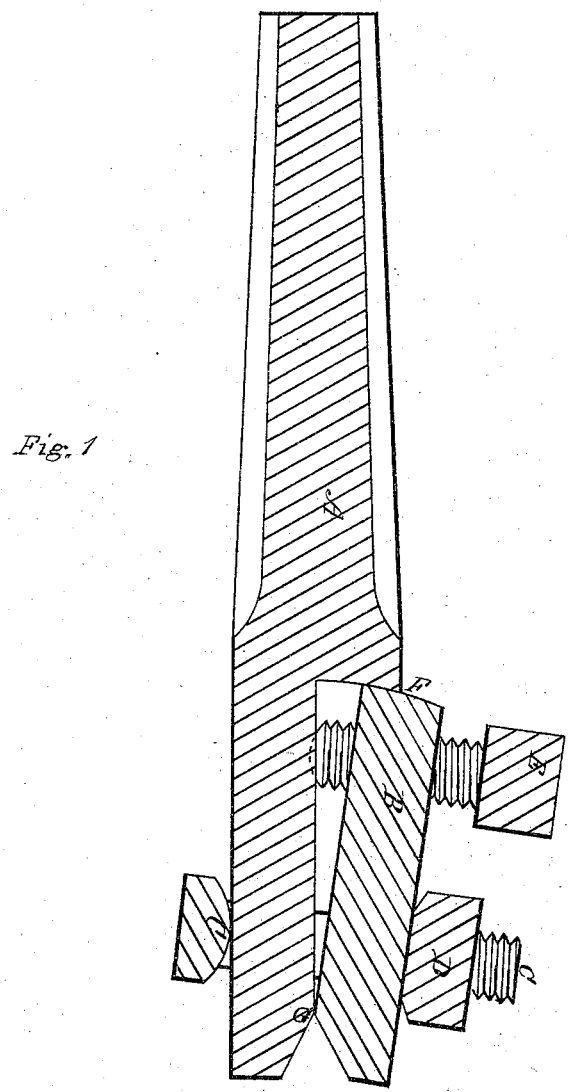

S. B. WILLIAMS.
Improvement in Saw-Swage.

No. 133,282.            Patented Nov. 19, 1872.

Witnesses
Joseph Williams
J. T. Baggs

Inventor
S. B. Williams

UNITED STATES PATENT OFFICE.

SAMUEL B. WILLIAMS, OF WHEELING, WEST VIRGINIA, ASSIGNOR OF ONE-HALF HIS RIGHT TO JACOB R. GREER AND ALEXANDER LAING, OF SAME PLACE.

IMPROVEMENT IN SAW-SWAGES.

Specification forming part of Letters Patent No. 133,282, dated November 19, 1872.

*To all whom it may concern:*

Be it known that I, SAMUEL B. WILLIAMS, of Wheeling, in the county of Ohio and State of West Virginia, have invented an Implement called a Swage, of which the following is a specification:

Nature and Object of my Invention.

My invention relates to swages used in spreading and sharpening the points of saw-teeth of either circular or upright saws, used in saw-mills for manufacturing lumber out of logs. By the use of this implement the point of the tooth is widened and made perfectly sharp.

Description of the Accompanying Drawing.

Figure 1 represents the whole machine or swage ready for being used.

General Description.

A is the main body of the swage, being a piece of iron and steel eight inches long and one and one-fourth inch square in the main, a portion of one end being diminished for the handle, and octagon in shape. Three inches of the other end is one-half cut away to receive jaw B. B is said jaw. C is bolt passing through both jaws, which clamps them together by means of the nut D. E is set-screw, which regulates jaw B.

The operation of this swage is so simple that but little need be said in explanation. Before using it is only necessary to place jaw B in proper position by set-screw E, and then tighten nut D, and, as the jaws are held very tight together immediately where the point of the tooth comes, by driving this machine on the point of the saw-tooth it is evident that it will widen and at the same time sharpen the tooth.

I claim—

A saw-swage, having an adjustable jaw held in its place by a screw-bolt, and adjusted by a set-screw working in a seat, substantially as set forth.

S. B. WILLIAMS.

Witnesses:
 JOSEPH WILLIAMS,
 J. T. BAGGS.